US011827724B2

(12) United States Patent
Ono et al.

(10) Patent No.: US 11,827,724 B2
(45) Date of Patent: Nov. 28, 2023

(54) POLYTETRAFLUOROETHYLENE AND METHOD FOR PRODUCING SAME

(75) Inventors: Makoto Ono, Settsu (JP); Hiroyuki Sato, Settsu (JP); Chie Sawauchi, Settsu (JP); Taketo Kato, Settsu (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 0 days.

(21) Appl. No.: 13/260,908

(22) PCT Filed: Mar. 30, 2010

(86) PCT No.: PCT/JP2010/055708
§ 371 (c)(1),
(2), (4) Date: Sep. 28, 2011

(87) PCT Pub. No.: WO2010/113950
PCT Pub. Date: Oct. 7, 2010

(65) Prior Publication Data
US 2012/0028046 A1    Feb. 2, 2012

(30) Foreign Application Priority Data
Mar. 30, 2009    (JP) .............................. 2009-082329

(51) Int. Cl.
| C08F 2/14 | (2006.01) |
| C08F 114/26 | (2006.01) |
| C08F 2/26 | (2006.01) |
| C08F 14/26 | (2006.01) |

(52) U.S. Cl.
CPC .............. *C08F 114/26* (2013.01); *C08F 2/26* (2013.01); *C08F 14/26* (2013.01); *Y10T 428/2982* (2015.01)

(58) Field of Classification Search
CPC combination set(s) only.
See application file for complete search history.

(56) References Cited

U.S. PATENT DOCUMENTS

| 4,016,345 A | * | 4/1977 | Holmes | ............... C08F 14/26 526/206 |
| 4,576,869 A | * | 3/1986 | Malhotra | ............ C08F 14/26 428/502 |
| 4,908,410 A | * | 3/1990 | Malhotra | .................. 525/276 |
| 6,136,933 A | * | 10/2000 | Jones | ...................... 526/255 |
| 2002/0161149 A1 | * | 10/2002 | Kobayashi et al. | .......... 526/250 |
| 2007/0135558 A1 | | 6/2007 | Tsuda et al. | |
| 2008/0200571 A1 | | 8/2008 | Higuchi et al. | |
| 2008/0207859 A1 | | 8/2008 | Matsuoka et al. | |
| 2009/0281231 A1 | * | 11/2009 | Kasai et al. | .................. 524/546 |
| 2012/0202906 A1 | | 8/2012 | Higuchi et al. | |

FOREIGN PATENT DOCUMENTS

| CN | 1875035 A | 12/2006 |
| CN | 101287766 A | 10/2008 |
| CN | 101296950 A | 10/2008 |
| EP | 1016679 B1 | 3/2004 |
| EP | 1688441 A1 | 8/2006 |
| EP | 1939222 A1 | 7/2008 |
| EP | 1939223 A1 | 7/2008 |
| EP | 1942118 A1 | 7/2008 |
| JP | 2000-143727 A | 5/2000 |
| JP | 2002-201217 A | 7/2002 |
| JP | 2003-119204 A | 4/2003 |
| JP | 2003119204 A | 4/2003 |
| WO | 2005042593 A1 | 5/2005 |
| WO | WO 2007046345 A1 | 4/2007 |
| WO | 2007049517 A1 | 5/2007 |
| WO | WO 2009001894 A1 | 12/2008 |
| WO | 2011/055824 A1 | 5/2011 |

OTHER PUBLICATIONS

Experimental report on the determination of logPOW of APFO.
OECD Guidelines for the Testing of Chemicals, Partition Coefficient (n-octanol/water), High Performance Liquid Chromatography (HPLC) Method, OECD/OCDE, Adopted: Apr. 13, 2004, vol. 117, pp. 1-11.
Revised Draft Hazard Assessment of Perfluorooctanoic Acid and Its Salts, U.S. Environmental Protection Agency Office of Pollution Prevention and Toxics Risk Assessment Division, Nov. 4, 2002, pp. 1-103 (107 pgs. total).

* cited by examiner

*Primary Examiner* — Scott R. Walshon
*Assistant Examiner* — Thomas A Mangohig
(74) *Attorney, Agent, or Firm* — Sughrue Mion, PLLC

(57) ABSTRACT

It is an object of the present invention to provide polytetrafluoroethylene suitable for forming a porous polytetrafluoroethylene film using a high water-soluble surfactant with high volatility. Polytetrafluoroethylene has non-melt-secondary-processability, standard specific gravity of 2.160 or less, an average primary particle size of 150 nm or more, stress relaxation time of 500 seconds or more, and break strength of 29.7 N or more. The polytetrafluoroethylene is obtainable by emulsion polymerization of tetrafluoroethylene in the presence of a fluorinated surfactant with Log POW of 3.4 or less.

1 Claim, No Drawings

POLYTETRAFLUOROETHYLENE AND METHOD FOR PRODUCING SAME

CROSS REFERENCE TO RELATED APPLICATIONS

This application is a National Stage of International Application No. PCT/JP2010/055708 filed Mar. 30, 2010, claiming priority based on Japanese Patent Application No. 2009-082329 filed Mar. 30, 2009, the contents of all of which are incorporated herein by reference in their entirety.

TECHNICAL FIELD

The present invention relates to polytetrafluoroethylene and a production method thereof.

BACKGROUND ART

Porous polytetrafluoroethylene films are produced by compacting polytetrafluoroethylene powder and highly stretching the resulting unsintered product. Gases such as water vapor penetrate the porous films, but waterdrops do not penetrate the porous films because polytetrafluoroethylene has high water repellency. Using such a unique property, the porous films are applied to clothing materials and separation membrane materials.

The following methods are known as production methods of polytetrafluoroethylene suitable for stretch.

Patent Document 1 discloses that a non-melt-secondary-processable polytetrafluoroethylene resin is produced by polymerization of tetrafluoroethylene using potassium permanganate/oxalic acid as a polymerization initiator in the presence of perfluorooctanoic acid ammonium [PFOA].

Patent Document 2 discloses that polytetrafluoroethylene is produced by polymerization of tetrafluoroethylene using a combination of potassium bromate and ammonium sulfite as a polymerization initiator in the presence of PFOA.

Patent Document 3 discloses that polytetrafluoroethylene is produced by polymerization of tetrafluoroethylene using disuccinic acid peroxide as a polymerization initiator in the presence of $CF_3CF_2OCF_2CF_2OCF_2COONH_4$.

Patent Document 4 discloses emulsion polymerization in an aqueous medium containing: a radical scavenger; and a perfluoro carboxylic acid in which carbon atoms to which a fluorine atom is bonded are 5 to 6, and a total number of carbon atoms and oxygen atoms constituting a main chain is 9 to 12, or the salts of the perfluoro carboxylic acid.
[Patent Document 1]
Japanese Kokai Publication 2000-143727 (Japanese Patent Publication 4452354)
[Patent Document 2]
Japanese Kokai Publication 2002-201217 (Japanese Patent Publication 3552685)
[Patent Document 3]
International Patent Application Publication No. 2007/046345
[Patent Document 4]
International Patent Application Publication No. 2009/001894

SUMMARY OF THE INVENTION

It is an object of the invention to provide polytetrafluoroethylene suitable for forming a porous polytetrafluoroethylene film using a high water-soluble fluorinated surfactant with high volatility.

That is, the present invention is polytetrafluoroethylene, having non-melt-secondary-processability, standard specific gravity of 2.160 or less, an average primary particle size of 150 nm or more, stress relaxation time of 500 seconds or more, and break strength of 29.7 N or more, the polytetrafluoroethylene being obtainable by emulsion polymerization of tetrafluoroethylene in the presence of a fluorinated surfactant with Log POW of 3.4 or less.

In the polytetrafluoroethylene of the present invention, the break strength is preferably 32.0 to 49.0 N.

The present invention is a production method of polytetrafluoroethylene, comprising the steps of: feeding a fluorinated surfactant with Log POW of 3.4 or less, water, and tetrafluoroethylene in a polymerization vessel, feeding a redox initiator to the polymerization vessel to initiate emulsion polymerization of the tetrafluoroethylene, and recovering polytetrafluoroethylene, wherein a total feed amount of the fluorinated surfactant is 1000 to 6000 ppm to final polytetrafluoroethylene yield (hereafter, also referred to as the first production method of the present invention).

The fluorinated surfactant is preferably at least one selected from the group consisting of: a compound represented by general formula $CF_3OCF(CF_3)CF_2OCF(CF_3)COOX$, in the formula, X being a hydrogen atom, $NH_4$, or an alkali metal atom; and a compound represented by general formula $CF_3CF_2OCF_2CF_2OCF_2COOX$, in the formula, X being a hydrogen atom, $NH_4$, or an alkali metal atom.

Effect of the Invention

A porous material produced from polytetrafluoroethylene of the present invention has high break strength. The production method of the present invention is as mentioned above. Therefore, polytetrafluoroethylene particularly suitable for the production of a porous material can be produced using a high water-soluble fluorinated surfactant with high volatility.

BEST MODES FOR CARRYING OUT THE INVENTION

The present invention is described in more detail below.
1. Polytetrafluoroethylene of the Present Invention The polytetrafluoroethylene of the present invention has non-melt-secondary-processability, standard specific gravity of 2.160 or less, an average primary particle size of 150 nm or more, stress relaxation time of 500 seconds or more, and break strength of 29.7 N or more. The polytetrafluoroethylene is obtainable by emulsion polymerization of tetrafluoroethylene in the presence of a fluorinated surfactant with Log POW of 3.4 or less.

A compound with large Log POW may have an adverse effect on the environment. In this aspect, it is preferred that a compound with Log POW of less than 3.5 is used. Commonly, perfluoro octanoic acid ammonium [PFOA] is used as a surfactant for producing a fluoropolymer by emulsion polymerization. PFOA has Log POW of 3.5, and therefore, a fluorinated surfactant with Log POW of 3.4 or less is preferably used instead of PFOA.

However, the fluorinated surfactant with Log POW of 3.4 or less is inferior in an emulsifying capacity. It is believed that the stability of aqueous dispersion used for polymerization is important for producing polytetrafluoroethylene having high break strength. In fact, a fluorinated surfactant inferior in an emulsifying capacity impairs the break strength of polytetrafluoroethylene.

The pamphlet of WO 2009/001894 discloses a method of using a large amount of fluorinated surfactant with small Log POW for improving the stability of aqueous dispersion. However, polytetrafluoroethylene produced by such a method does not have sufficient break strength.

The present inventors made various investigations and found that polymerization initiated by a redox initiator using a small amount of a fluorinated surfactant with a sufficiently-low emulsifying capacity enables production of polytetrafluoroethylene having high break strength.

That is, the polytetrafluoroethylene of the present invention is noble polytetrafluoroethylene having break strength that is unpredictably high for polytetrafluoroethylene produced in the presence of a fluorinated surfactant with Log POW of 3.4 or less.

The present invention is polytetrafluoroethylene produced by emulsion polymerization of tetrafluoroethylene in the presence of a fluorinated surfactant with Log POW of 3.4 or less. Therefore such polytetrafluoroethylene is environment-friendly, and is easily produced because the fluorinated surfactant is easily rinsed off.

Further, the polytetrafluoroethylene thus produced has break strength of 29.7 N or more. The use of a fluorinated surfactant with a low emulsifying capacity impairs the stability of aqueous dispersion, which usually results in production of polytetrafluoroethylene having low break strength. However, surprisingly, the break strength of the polytetrafluoroethylene is equivalent to that of polytetrafluoroethylene disclosed in Japanese Kokai Publication 2000-143727 (Japanese Patent Publication 4452354) and disclosed in Japanese Kokai Publication 2002-201217 (Japanese Patent Publication 3552685).

The polytetrafluoroethylene of the present invention preferably has break strength of 32.0 to 49.0 N.

The polytetrafluoroethylene of the present invention is produced in the presence of a fluorinated surfactant with Log POW of 3.4 or less, and may be produced in the presence of a fluorinated surfactant with Log POW of not less than 2.5 or not less than 3.0.

The Log POW is distribution coefficient between 1-octanol and water. The Log POW is represented by Log P, wherein P is the ratio of a concentration of a fluorinated surfactant in an octanol phase to a concentration of a fluorinated surfactant in a water phase when an octanol/water (1:1) mixture containing a fluorinated surfactant is phase-separated.

Preferred examples of the fluorinated surfactant with Log POW of 3.4 or less include anionic fluorinated surfactants. Such anionic fluorinated surfactants are disclosed in US 2007/0015864, US 2007/0015865, US 2007/0015866, US 2007/0276103, US 2007/0117914, US 2007/142541, US 2008/0015319, U.S. Pat. Nos. 3,250,808, 3,271,341, JP 2003-119204, WO 2005/042593, WO 2008/060461, WO 2007/046377, WO 2007/119526, WO 2007/046482, and WO 2007/046345.

The fluorinated surfactant with Log POW of 3.4 or less is preferably at least one selected from the group consisting of: compounds represented by general formula $CF_3OCF(CF_3)$ $CF_2OCF(CF_3)COOX$ (in the formula, X being a hydrogen atom, $NH_4$, or an alkali metal atom); and compounds represented by general formula $CF_3CF_2OCF_2CF_2$ $OCF_2COOX$ (in the formula, X being a hydrogen atom, $NH_4$, or an alkali metal atom).

Examples of the fluorinated surfactant with Log POW of 3.4 or less further include $CF_3OCF_2CF_2OCF_2CF_2COONH_4$, and compounds represented by general formula $CF_3OCF_2CF_2CF_2OCHFCF_2COOX$ (in the formula, X being a hydrogen atom, $NH_4$, or an alkali metal atom).

When the fluorinated surfactant is the salt of such compounds, the salt comprises an alkali metal ion, $NH_4^+$, or the like, as a counter ion. Examples of the alkali metal ion include $Na^+$ and $K^+$.

Examples of the fluorinated surfactant with Log POW of 3.4 or less include $CF_3OCF(CF_3)$ $CF_2OCF(CF_3)$ COOH, $CF_3OCF(CF_3)$ $CF_2OCF(CF_3)COONH_4$, $CF_3CF_2OCF_2$ $CF_2$ $OCF_2COOH$, $CF_3CF_2OCF_2CF_2OCF_2COONH_4$, $CF_3OCF_2$ $CF_2$ $CF_2OCHFCF_2COOH$, and $CF_3OCF_2CF_2CF_2$ $OCHFCF_2COONH_4$.

The polytetrafluoroethylene of the present invention is produced by polymerization of tetrafluoroethylene in the presence of the fluorinated surfactant with Log POW of 3.4 or less. However, the fluorinated surfactant may not be detected from the polytetrafluoroethylene at all because the fluorinated surfactant with Log POW of 3.4 or less is highly soluble in water and has high volatility. Even if no fluorinated surfactant is detected, polytetrafluoroethylene produced in accordance with "the PFOA self-reduction program (PFOA 2010/2015 Stewardship Program)" of United States Environmental Protection Agency is regarded as one produced by polymerization of tetrafluoroethylene in the presence of the fluorinated surfactant with Log POW of 3.4 or less.

The polytetrafluoroethylene of the present invention is produced by emulsion polymerization in the absence of a fluorinated surfactant with Log POW exceeding 3.4.

The polytetrafluoroethylene [TFE polymer] of the present invention may be a TFE homopolymer, or a copolymer of TFE and a modified monomer, which has non-melt processability (hereinafter "modified PTFE"). The modified PTFE can be produced by polymerization of TFE and a well-known modified monomer.

Examples of the modified monomer include fluoroolefins, such as hexafluoropropylene [HFP] and chlorotrifluoroethylene [CTFE]; fluoro (alkyl vinyl ether) containing a C1-C5 alkyl group, particularly fluoro (alkyl vinyl ether) containing a C1-C3 alkyl group; fluorinated cyclic monomers, such as fluorodioxol; perfluoroalkylethylene; and ω-hydroperfluoroolefin. The modifiedmonomer may be fed all at once before the polymerization, or continuously, or intermittently in divided portions.

The modified monomer content in the modified PTFE is preferably within the range of 0.001 to 2 mol %, more preferably within the range of 0.001 to 1 mol %.

The polytetrafluoroethylene may have a core-shell structure. Examples of the polytetrafluoroethylene having a core-shell structure include a modified polytetrafluoroethylene containing a core of high-molecular-weight polytetrafluoroethylene and a shell of low-molecular-weight polytetrafluoroethylene or modified polytetrafluoroethylene. Examples of the modified polytetrafluoroethylene include polytetrafluoroethylene disclosed in Japanese Kohyo Publication 2005-527652.

The polytetrafluoroethylene of the present invention has standard specific gravity [SSG] of 2.160 or less, and preferably 2.157 or less. The extrudate of the polytetrafluoroethylene with SSG of 2.160 or less has a draw ratio exceeding 3000%, and is therefore suitable for stretching. The SSG is defined by ASTM D4895-89 as a measure of a molecular weight of polytetrafluoroethylene having no melt processability.

The polytetrafluoroethylene of the present invention has an average primary particle size of 150 nm or more, and preferably 180 nm or more. Polytetrafluoroethylene having a large average primary particle size suppresses an increase in paste extrusion pressure in the paste extrusion thereof in a powder form and is allowed to have excellent film forming properties. The upper limit of the average primary particle size of the polytetrafluoroethylene may be, but not limited to, 500 nm.

Extrusion pressure of the polytetrafluoroethylene of the present invention is preferably 9.8 to 24.5 MPa, more preferably 9.8 to 20.0 MPa, and still more preferably 9.8 to 19.0 MPa.

Stress relaxation time of the polytetrafluoroethylene of the present invention is 500 seconds or more, preferably 600 seconds or longer, and more preferably 700 seconds or longer.

The polytetrafluoroethylene of the present invention has stretchability, fibrillatability, and non-melt-secondary-processability.

The polytetrafluoroethylene of the present invention may be a particle, or may be a powder.

The polytetrafluoroethylene of the present invention is particularly preferred as a material for forming a porous material.

2. The First Production Method of the Present Invention

The first production method of the present invention includes the steps of: feeding a fluorinated surfactant with Log POW of 3.4 or less, water, and tetrafluoroethylene in a polymerization vessel; feeding a redox initiator to the polymerization vessel to initiate emulsion polymerization of the tetrafluoroethylene; and recovering polytetrafluoroethylene, wherein a total feed amount of the fluorinated surfactant is 1000 to 6000 ppm to final polytetrafluoroethylene yield.

The polytetrafluoroethylene of the present invention can be produced by the first production method of the present invention. The first production method of the present invention uses a redox initiator and a fluorinated surfactant with Log POW of 3.4 or less in a very small amount.

The fluorinated surfactant used in the first production method of the present invention has a low emulsifying capacity and may be used only in a limited amount, which may make it difficult to achieve stable emulsion polymerization.

However, the present inventors found that such strict control of polymerization conditions gives polytetrafluoroethylene in which a very unstable polymerization locus shows high break strength.

It is not clear why use of a redox-polymerization initiator and a small amount of fluorinated surfactant with a low emulsifying capacity gives polytetrafluoroethylene having high break strength. This may be caused by synergistic effect of both the fluorinated surfactant and the redox-polymerization initiator.

First, the sufficiently-low emulsifying capacity of the fluorinated surfactant and the small amount thereof used would suppress the generation of a new polymerization locus during the polymerization reaction, particularly the last half of the polymerization reaction. Second, use of the redox initiator allows feeding of radicals in an amount sufficient for the initiation of the polymerization only during the first half of the polymerization reaction. Radicals are hardly generated in the last half of the polymerization reaction.

In this case, little radicals are supplied during the last half of the polymerization reaction and the polymerization reaction proceeds in limited polymerization loci. Therefore, the generation of low-molecular-weight polytetrafluoroethylene and/or an oligomer is suppressed, which may provide polytetrafluoroethylene having high break strength.

The first production method of the present invention includes the steps of: feeding a fluorinated surfactant with Log POW of 3.4 or less, water, and tetrafluoroethylene in a polymerization vessel; feeding a polymerization initiator to the polymerization vessel to initiate emulsion polymerization of the tetrafluoroethylene; and recovering the resulting polytetrafluoroethylene.

Preferred examples of the fluorinated surfactant with Log POW of 3.4 or less are described above.

In the first production method of the present invention, the fluorinated surfactant is fed in an amount of 1000 to 6000 ppm relative to final polytetrafluoroethylene yield. The fluorinated surfactant may be fed all at once before the polymerization, or may be fed in divided portions during the polymerization reaction. A preferred lower limit of the amount of the fluorinated surfactant used is 2000 ppm, and a preferred upper limit of the amount of the fluorinated surfactant used is 5000 ppm.

In the first production method of the present invention, the upper limit of the amount of the fluorinated surfactant used is important. An excessive amount of the fluorinated surfactant lowers the break strength of the polytetrafluoroethylene.

3. Second Production Method of the Present Invention

The second production method of the present invention includes the step of emulsion polymerization of at least tetrafluoroethylene by adding a redox initiator in the presence of one or more types of fluorinated surfactants represented by general formulae (I) to (III).

The fluorinated surfactant(s) is any of fluoroether carboxylic acids or salts thereof represented by general formulae (I) to (III). These fluoroether carboxylic acids or salts thereof have higher solubility in water and higher volatility than those of perfluoro octanoic acid ammonium [PFOA]. Therefore, they are easily removed from polytetrafluoroethylene.

As the fluorinated surfactant (s), one or more types of fluoroether carboxylic acids or salts thereof represented by the following formulae are used. Examples of the fluoroether carboxylic acids or salts thereof include compounds represented by general formula (I):

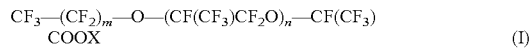

(in the formula, m is an integer of 0 to 4, n is an integer of 0 to 2, and X represents a hydrogen atom, $NH_4$, or an alkali metal atom); compounds represented by general formula (II):

(in the formula, m is an integer of 0 to 4, n is an integer of 0 to 2, and X represents a hydrogen atom, $NH_4$, or an alkali metal atom); and compounds represented by general formula (III):

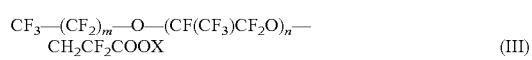

(in the formula, m is an integer of 0 to 4, n is an integer of 0 to 2, and X represents a hydrogen atom, $NH_4$, or an alkali metal atom).

It is preferred that m is an integer of 0 to 2, and more preferably 0.

It is preferred that n is 0 or 1.

X represents a monovalent hydrogen atom, $NH_4$ (ammonium group), or an alkali metal atom. Examples of the alkali metal atom include Li, Na, and K.

In order to achieve high solubility in water, X is preferably $NH_4$ or an alkali metal atom. In order to achieve easy removal by heat treatment, X is preferably $NH_4$.

Further, X is preferably a hydrogen atom. In this case, the surface activity in water of the fluoroether carboxylic acids is improved more than that of the fluoroether carboxylates. For example, when they are each dissolved in a solution at the same molar concentration, the surface tension of a solution containing the fluoroether carboxylic acids is lower than that of a solution containing salts thereof. As a result, use of the fluoroether carboxylic acids for polymerization provides the advantages of: producing more stable and small polymer particles; imparting high stability to polymer colloid produced; reducing coagulation during polymerization; and allowing the polymerization to proceed even when the concentration of the reactant is high.

In the production method of the polytetrafluoroethylene of the present invention, when at least one of the fluoroether carboxylic acids or salts thereof are used as a fluorinated surfactant(s), polytetrafluoroethylene can be efficiently produced. In addition, in the production method of the polytetrafluoroethylene of the present invention, two or more of the fluoroether carboxylic acids or salts thereof may be used in combination as the fluorinated surfactant(s), and compounds having surface activity other than the fluoroether carboxylic acids or salts thereof may be additionally used if the compounds have volatility or may remain in a product of polytetrafluoroethylene. The compounds having surface activity other than the fluoroether carboxylic acids are mentioned above.

A total amount of the fluoroether carboxylic acids or salts thereof is preferably 0.0001 to 10% by mass relative to an amount of an aqueous medium. A more preferred lower limit of the amount of the fluoroether carboxylic acids or salts thereof is 0.001% by mass. A more preferred upper limit of the amount thereof is 2% by mass, and a still more preferred upper limit thereof is 1% by mass. If the amount of the fluoroether carboxylic acids or salts thereof is too small, dispersion force may be insufficient. If the amount of the fluoroether carboxylic acids or salts thereof is too large, the effect obtained does not counterbalance the amount, and moreover, the rate of polymerization may be reduced and the reaction may terminate. An amount of the compounds is appropriately determined depending on, for example, the molecular weight of the target polytetrafluoroethylene.

For the above polymerization, a pressure-resistant reaction vessel equipped with a stirrer is charged with an aqueous medium and the fluorinated surfactant(s), and after deoxygenation, charged with tetrafluoroethylene [TFE], then heated to a predetermined temperature. A polymerization initiator is added thereto to initiate polymerization reaction. Since otherwise the pressure lowers with the progress of the reaction, TFE is additionally fed either continuously or intermittently so as to maintain the initial pressure. After a predetermined amount of TFE is fed, the feeding is stopped, the TFE remaining in the reaction vessel is purged therefrom, and the temperature is returned to room temperature for termination of the reaction.

The polytetrafluoroethylene produced by the second production method of the present invention has excellent characteristics described below.

According to the production method of the present invention, the polytetrafluoroethylene with SSG of 2.160 or less can be produced. The extrudate of the polytetrafluoroethylene with SSG of 2.160 or less has a draw ratio exceeding 3000%, and is therefore suitable for stretching. The SSG is defined, by ASTM D4895-89, as a measure of a molecular weight of polytetrafluoroethylene having no melt processability.

According to the second production method of the present invention, the polytetrafluoroethylene having an average primary particle size of 0.180 μm or more can be produced. Polytetrafluoroethylene having a large average primary particle size suppresses an increase in paste extrusion pressure in the paste extrusion thereof in a powder form and is allowed to have excellent film forming properties.

According to the second production method of the present invention, the extrusion pressure of the polytetrafluoroethylene is preferably 9.8 to 24.5 MPa, more preferably 9.8 to 20.0 MPa, and still more preferably 9.8 to 19.0 MPa.

The polytetrafluoroethylene produced in accordance with the second production method of the present invention is particularly preferred as a material for forming a porous material.

A porous material produced from the polytetrafluoroethylene produced in accordance with the second production method of the present invention has break strength of 29 N or more. A stress relaxation time of the porous material is 500 seconds or longer, and preferably 600 seconds or longer.

However, in the second production method of the present invention, the amount of the fluorinated surfactant must be controlled in accordance with the first production method of the present invention for high break strength when a fluorinated surfactant with Log POW of 3.4 or less is used, but a fluorinated surfactant with Log POW exceeding 3.4 is not used.

4. Common Matters in the First and Second Production Methods of the Present Invention The first and second production methods of the present invention each have the feature described above. These production methods further have the following features.

A redox initiator as a polymerization initiator provides polytetrafluoroethylene particularly suitable for production of a porous material. An amount of the redox initiator is appropriately determined depending on the molecular weight of a target polytetrafluoroethylene and a rate of reaction. The redox initiator is preferably used in an amount of 0.1 to 200 ppm, and more preferably 0.5 to 100 ppm to final polytetrafluoroethylene yield.

Examples of the above redox initiator include combinations of persulfates or organic peroxides with reducing agents such as sulfites, bisulfites, bromates, diimines, and oxalic acid. Examples of the sulfites include sodium sulfite. Examples of the bisulfites include sodium bisulfite.

Specific examples of the above redox initiator include potassium permanganate/oxalic acid, ammonium persulfate/bisulfites/iron sulfate, manganese triacetate/oxalic acid, cerium ammonium nitrate/oxalic acid, and bromates/bisulfites. Among them, potassium permanganate/oxalic acid is preferred. When using the redox initiator, one of an oxidizing agent and a reducing agent may be put into a polymerization vessel in advance, and the other may be put thereinto continuously or intermittently to initiate the polymerization. For example, it is preferred that, when potassium permanganate/oxalic acid are used, oxalic acid is put into a polymerization vessel in advance and potassium permanganate is put continuously thereinto.

In the production method of the polytetrafluoroethylene of the present invention, in order to reduce the amount of congelation generated during the polymerization, it is preferred to carry out the polymerization in the presence of 25 to 200 ppm dicarboxylic acids to an amount of the aqueous medium. It is more preferred to carry out the polymerization in the presence of 30 to 200 ppm dicarboxylic acids. If the amount of the dicarboxylic acids is less than 25 ppm to the aqueous medium, effect may not be sufficiently achieved. If the amount of the dicarboxylic acids exceeds 200 ppm to the aqueous medium, a chain transfer reaction may occur, which results in a low molecular weight polymer. The amount of the dicarboxylic acids is preferably 150 ppm or less. The dicarboxylic acids may be added before the polymerization reaction, or may be added during the polymerization reaction.

The above dicarboxylic acids are preferably represented by general formula HOOCRCOOH (in the formula, R represents a C1-C5 alkylene group). Succinic acid, malonic acid, glutaric acid, adipic acid, and pimelic acid are more preferred. Succinic acid is still more preferred.

The above polymerization can be carried out under the pressure of 0.05 to 5.0 MPa, and preferably carried out under the pressure of 1.5 to 3.0 MPa.

The aqueous medium referred to hereinabove is a medium in which the polymerization is to be carried out and means a water-containing liquid. The aqueous medium is not particularly limited provided that it is water or a water-containing liquid. It may be composed of water and a fluorine-free organic solvent, such as alcohols, ethers or ketones, and/or a fluorine-containing organic solvent having a boiling point of not higher than 40° C.

The polymerization can be carried out at a temperature of 10 to 100° C., and preferably carried out at a temperature of 50 to 90° C.

Further, in the above polymerization, one or more of stabilizers and chain transfer agents known in the art may be added in accordance with the intended purpose.

Examples of the stabilizers include saturated hydrocarbons that are inert to the reaction and are in a liquid form under the above reaction conditions, and each have not less than 12 carbon atoms. Paraffin wax is preferred. Examples of other dispersion stabilizers other than the saturated hydrocarbons include fluorinated oils, fluorosolvents, and silicone oils. The stabilizers may be used in an amount of 2 to 10 parts by mass to 100 parts by mass of the aqueous medium.

Any of known chain transfer agents may be used, and examples thereof include saturated hydrocarbons such as methane, ethane, propane, and butane; halogenated hydrocarbons such as chloromethane, dichloromethane, and difluoroethane; alcohols such as methanol and ethanol; and hydrogen. Those which are gaseous at ordinary temperature and ordinary pressure are preferred. The chain transfer agent is generally used in an amount of 1 to 1000 ppm, preferably 1 to 500 ppm to the total feed of TFE.

Further, during polymerization, the radical concentration in the system can be adjusted by adding a radical scavenger such as hydroquinone or catechol, or a peroxide-decomposing agent such as ammonium sulfite.

Furthermore, ammonium carbonate, ammonium phosphate or the like may be added as a buffering agent for adjusting the pH during reaction.

The production method of the polytetrafluoroethylene of the present invention may include the step of adding a modified monomer in a polymerization vessel. The modified monomer may be fed all at once before the polymerization, or continuously, or intermittently in divided portions.

The production method of the polytetrafluoroethylene of the present invention may include the step of polymerizing TFE in an aqueous medium in the presence of the fluorinated surfactant to produce an aqueous emulsion (seed dispersion), and the step of polymerizing (seed-polymerizing) TFE in the presence of the aqueous emulsion (seed dispersion).

After completion of the polymerization of the polytetrafluoroethylene, the polytetrafluoroethylene concentration, on the solid matter basis, in the aqueous dispersion is 20 to 70% by mass. The aqueous dispersion includes the fluorinated surfactant and the polytetrafluoroethylene. An average primary particle size of the polytetrafluoroethylene is 50 to 500 nm.

The production method of the present invention preferably includes at least one of the steps of recovering aqueous polytetrafluoroethylene dispersion; coagulating polytetrafluoroethylene in the aqueous polytetrafluoroethylene dispersion; recovering the polytetrafluoroethylene coagulated; drying the polytetrafluoroethylene at 100 to 250° C.; mixing the resulting polytetrafluoroethylene dried with an extrusion aid and extruding the mixture at an extrusion pressure of 9.8 to 24.5 MPa to form a beading; and heating the resulting beading at 200 to 230° C. to remove the extrusion aid, and producing bead-shaped polytetrafluoroethylene.

The break strength of the porous material produced from a stretched beading is increased as the extrusion pressure for forming the beading is increased. The stretched beading having a break strength of 29.7 N or more is produced from the PTFE of the present invention even when the extrusion pressure of 20 MPa or less is applied during the formation of the stretched beading.

Fine powder can be produced by coagulating the polytetrafluoroethylene included in the aqueous dispersion. The fine powder is produced by coagulating, rinsing, and drying the polytetrafluoroethylene in the aqueous dispersion. When the aqueous dispersion of the polytetrafluoroethylene is subjected to coagulation, the aqueous dispersion produced by polymerization of a polymeric latex and the like is generally diluted with water to a polymer concentration of 10 to 20% by mass. Then, if necessary, pH is adjusted to a neutral or alkaline level, and the resulting solution is stirred in a vessel equipped with a stirrer more vigorously than the stirring during reaction. The coagulation may also be carried out by stirring while adding, as a coagulating agent, a water-soluble organic compound such as methanol or acetone, an inorganic salt such as potassium nitrate or ammonium carbonate, or an inorganic acid such as hydrochloric acid, sulfuric acid or nitric acid or the like. The coagulation may also be carried out continuously using an in-line mixer or the like.

When one or more of pigments for coloration and/or of various fillers for improvements in mechanical properties are added before coagulation or during coagulation, pigmented or filled polytetrafluoroethylene fine powder can be obtained with the pigments or fillers uniformly dispersed therein.

The wet powder obtained by coagulation of the polytetrafluoroethylene is generally dried using such means as vacuum, high-frequency or hot air while maintained in a condition such that it flows little, preferably it stands still. Friction among powder particles at elevated temperatures, in particular, generally exerts unfavorable influences on the polytetrafluoroethylene in fine powder form. This is because this kind of polytetrafluoroethylene particles has a property such that they are readily fibrillated upon exposure to even a weak shearing force and lose their original stable particle structure. The above drying is carried out at a drying temperature of 10 to 250° C., preferably 100 to 220° C., and more preferably 100 to 200° C.

The porous material can be produced by extrusion rolling the polytetrafluoroethylene powder into a paste, then unsintering or semi-sintering the paste, and stretching the paste in at least one direction (preferably roll stretching the paste in a rolling direction, and stretching in a transverse direction by a tenter). The stretching is performed under the conditions of a rate of stretching of 5 to 1000%/sec, and a draw ratio of 500% or more. The polytetrafluoroethylene is easily fibrillated by being subjected to the stretching, and is formed into a polytetrafluoroethylene porous material (film) comprising tubercles and fibers. The void ratio of the polytetrafluoroethylene porous material (film) is generally, but not particularly limited to, preferably 50 to 99%, and more preferably 70 to 98%.

The above porous material (film) can be used in various kinds of forms, for example, a membrane, a fiber, a rod, and a tube, and can be preferably used in various kinds of filters such as a chemical filter and an air filter The porous material (film) is useful as materials of products used for textiles and used in a medical field, as well.

EXAMPLES

In Examples, physical properties were measured in the following way.
(1) Polymer Solid Concentration An amount of 1 g of aqueous polytetrafluoroethylene dispersion was dried in an air blow-dryer at 150° C. for 30 minutes. The proportion of the weight of the residue on heating to the weight (1 g) of the aqueous dispersion was expressed in percentage. The percentage was regarded as a polymer solid concentration.
(2) Average Primary Particle Size The aqueous polytetrafluoroethylene dispersion was diluted with water so as to have a solid concentration of 0.15% by mass. The transmittance of incident light rays having a wavelength of 550 nm per unit length of the diluted latex produced, and the number-based length average particle size of the polytetrafluoroethylene as determined by particle size measurements in a certain specific direction on a transmission electron photomicrograph were measured to generate a calibration curve. The number-average particle size of the polytetrafluoroethylene was determined by actual transmittance of the incident light rays having a wavelength of 550 nm of samples, based on the calibration curve.
(3) Standard Specific Gravity [SSG]

The specific gravity of a sample that is prepared in accordance with ASTM D 4895-89 was measured by the water displacement method.
(4) Measurement of Extrusion Pressure A glass vessel was charged with 100 g of fine powder, and 18.0% by mass of a lubricant (trade name: IP1620 (trademark), product of Idemitsu Kosan Co., Ltd.) based on the total weight of the fine powder and the lubricant. The contents were then blended at room temperature for three minutes. Subsequently, the glass vessel was allowed to stand at room temperature (25° C.) for at least one hour before being subjected to extrusion to produce a lubricated resin. The lubricated resin was paste-extruded at a reduction ratio of 100:1 at room temperature through an orifice (2.4 mm diameter, 5 mml and length, 30° entrance angle) into a uniform beading (extrudate). An extrusion speed, i.e., a ram speed, was 20 inch/min (51 cm/min). An extrusion pressure was determined by dividing a load under an equilibrium condition in paste extrusion by a value of a cross-section area of a cylinder used for the paste extrusion.
(5) Stretch Test The beading obtained by the paste extrusion was heated at 230° C. for 30 minutes to remove the lubricant. The beading (extrudate) was cut to an appropriate length. Each end of the beading piece was fixed to give a distance of either 1.5 inch (38 mm) or 2.0 inch (51 mm) between clamps, and the beading piece was heated to 300° C. in a circulating air oven. The clamps were then moved apart at the desired rate (stretching speed) to a separation distance corresponding to the desired stretch (total stretch). The stretch test was thus performed. This stretch procedure essentially followed a method disclosed in U.S. Pat. No. 4,576,869 except that the extrusion speed was different (51 cm/min instead of 84 cm/min). "Stretch" was the increase in length by stretching, normally expressed relative to original length. In the above production method, the stretch rate was 100%/sec, and the total stretch was 2400%.
(6) Break Strength The stretched beading (a specimen obtained by stretching a beading) obtained in the above stretch test was pulled at a rate of 300 ram/min at a temperature of 25° C. to be subjected to a tensile test. The strength upon breaking was measured to determine the break strength.
(7) Stress Relaxation Time The beading for stress relaxation time measurement was made in the stretch test by stretching the beading under the conditions of 1.5 inch (3.8 cm) between clamps, a stretch rate of 1000%/sec, and a total stretch of 2400%. Both ends of the beading were tied to a fixture so that there was a taut 8-inch-span (20-cm-span) beading. The temperature of an oven was maintained at 390° C., and the fixture was inserted into the oven through a (covered) slit in the side of the oven. The time from when the fixture was inserted into the oven until the beading breaks was determined as the stress relaxation time.

The Log POW of the fluorinated surfactants used in Examples was as follows.

$CF_3$—O—$CF(CF_3)CF_2O$—$CF(CF_3)$ $COONH_4$: 3.4
$CF_3OCF_2CF_2OCF_2CF_2COONH_4$: 3.0
$CF_3CF_2OCF_2CF_2OCF_2COONH_4$: 3.1

Example 1

A 6-L polymerization vessel was charged with 3600 g of ultrapure water, 180 g of paraffin wax, 5.4 g of a surfactant ($CF_3$—O—$CF(CF_3)$ $CF_2O$—$CF(CF_3)$ $COONH_4$), 0.108 g of succinic acid, and 0.0252 g of oxalic acid. The vessel was deaerated by purging with nitrogen, and heated to a temperature of 70° C. After stabilization of the polymerization vessel inside temperature, tetrafluoroethylene gas was introduced into the vessel to a pressure of 2.7 MPa.

Ultrapure water containing 3.5 mg of potassium permanganate was continuously added to the contents with stirring at a constant speed, and TFE was then continuously fed to maintain the polymerization vessel inside pressure at a constant level of 2.7 MPa. At the time when the TFE consumption reached 900 g, addition of the ultrapure water containing 3.5 mg of the potassium permanganate was completed. At the time when the TFE consumption reached 1500 g, the stirring and TFE feeding were discontinued. Then, the TFE in the polymerization vessel was purged away, and the gaseous phase was replaced with nitrogen. Aqueous polytetrafluoroethylene dispersion (solid content 29.5% by mass) was thus obtained. The fluorinated surfactant was used in an amount of 3600 ppm to final polytetrafluoroethylene yield.

The resulting aqueous polytetrafluoroethylene dispersion was diluted so as to have a solid concentration of 15% by mass. The dilute solution was vigorously stirred in a vessel equipped with a stirrer in the presence of nitric acid. The polytetrafluoroethylene was thus coagulated. The coagulated polytetrafluoroethylene was separated, and dried at 210° C.

for 18 hours to produce fine powder of the polytetrafluoroethylene. Various properties were measured for the fine powder produced. Table 1 shows the results.

Example 2

A 6-L polymerization vessel was charged with 3600 g of ultrapure water, 180 g of paraffin wax, 2.2 g of a surfactant ($CF_3$—O—$CF(CF_3)CF_2$O—$CF(CF_3)$ $COONH_4$), 0.108 g of succinic acid, and 0.0252 g of oxalic acid. The vessel was deaerated by purging with nitrogen, and heated to a temperature of 70° C. After stabilization of the polymerization vessel inside temperature, tetrafluoroethylene gas was introduced into the vessel to a pressure of 2.7 MPa.

Ultrapure water containing 3.5 mg of potassium permanganate was continuously added to the contents with stirring at a constant speed, and TFE was then continuously fed to maintain the polymerization vessel inside pressure at a constant level of 2.7 MPa. At the time when the TFE consumption reached 184 g, 3.2 g of a surfactant ($CF_3$—O—$CF(CF_3)$ $CF_2$O—$CF(CF_3)$ $COONH_4$) was added. At the time when the TFE consumption reached 900 g, addition of the ultrapure water containing 3.5 mg of the potassium permanganate was completed. At the time when the TFE consumption reached 1637 g, the stirring and TFE feeding were discontinued. Then, the TFE in the polymerization vessel was purged away, and the gaseous phase was replaced with nitrogen. Aqueous polytetrafluoroethylene dispersion (solid content 30.9% by mass) was thus obtained. The fluorinated surfactant was used in an amount of 3290 ppm to final polytetrafluoroethylene yield.

The resulting aqueous polytetrafluoroethylene dispersion was diluted so as to have a solid concentration of 15% by mass. The dilute solution was vigorously stirred in a vessel equipped with a stirrer in the presence of nitric acid. The polytetrafluoroethylene was thus coagulated. The coagulated polytetrafluoroethylene was separated, and dried at 210° C. for 18 hours to produce fine powder of the polytetrafluoroethylene. Various properties were measured for the fine powder produced. Table 1 shows the results.

Example 3

A 6-L polymerization vessel was charged with 3600 g of ultrapure water, 180 g of paraffin wax, 5.4 g of a surfactant $CF_3OCF_2CF_2OCF_2CF_2COONH_4$, 0.108 g of succinic acid, and 0.0252 g of oxalic acid. The vessel was deaerated by purging with nitrogen, and heated to a temperature of 70° C. After stabilization of the polymerization vessel inside temperature, tetrafluoroethylene gas was introduced into the vessel to a pressure of 2.7 MPa.

Ultrapure water containing 3.5 mg of potassium permanganate was continuously added to the contents with stirring at a constant speed, and TFE was then continuously fed to maintain the polymerization vessel inside pressure at a constant level of 2.7 MPa. At the time when the TFE consumption reached 184 g, 3.8 g of a surfactant $CF_3OCF_2CF_2OCF_2CF_2COONH_4$ was added. At the time when the TFE consumption reached 900 g, addition of the ultrapure water containing 3.5 mg of the potassium permanganate was completed. At the time when the TFE consumption reached 1543 g, the stirring and TFE feeding were discontinued. Then, the TFE in the polymerization vessel was purged away, and the gaseous phase was replaced with nitrogen. Aqueous polytetrafluoroethylene dispersion (solid content 30.3% by mass) was thus obtained. The fluorinated surfactant was used in an amount of 6000 ppm to final polytetrafluoroethylene yield.

The resulting aqueous polytetrafluoroethylene dispersion was diluted so as to have a solid concentration of 15% by mass. The dilute solution was vigorously stirred in a vessel equipped with a stirrer in the presence of nitric acid. The polytetrafluoroethylene was thus coagulated. The coagulated polytetrafluoroethylene was separated, and dried at 210° C. for 18 hours to produce fine powder of the polytetrafluoroethylene. Various properties were measured for the fine powder produced. Table 1 shows the results.

Example 4

A 6-L polymerization vessel was charged with 3600 g of ultrapure water, 180 g of paraffin wax, 5.4 g of a surfactant $CF_3CF_2OCF_2CF_2OCF_2COONH_4$, 0.108 g of succinic acid, and 0.0252 g of oxalic acid. The vessel was deaerated by purging with nitrogen, and heated to a temperature of 70° C. After stabilization of the polymerization vessel inside temperature, tetrafluoroethylene gas was introduced into the vessel to a pressure of 2.7 MPa.

Ultrapure water containing 3.5 mg of potassium permanganate was continuously added to the contents with stirring at a constant speed, and TFE was then continuously fed to maintain the polymerization vessel inside pressure at a constant level of 2.7 MPa. At the time when the TFE consumption reached 184 g, 3.8 g of a surfactant $CF_3OCF_2CF_2OCF_2CF_2COONH_4$ was added. At the time when the TFE consumption reached 900 g, addition of the ultrapure water containing 3.5 mg of the potassium permanganate was completed. At the time when the TFE consumption reached 1543 g, the stirring and TFE feeding were discontinued. Then, the TFE in the polymerization vessel was purged away, and the gaseous phase was replaced with nitrogen. Aqueous polytetrafluoroethylene dispersion (solid content 30.6% by mass) was thus obtained. The fluorinated surfactant was used in an amount of 6000 ppm to final polytetrafluoroethylene yield.

The resulting aqueous polytetrafluoroethylene dispersion was diluted so as to have a solid concentration of 15% by mass. The dilute solution was vigorously stirred in a vessel equipped with a stirrer in the presence of nitric acid. The polytetrafluoroethylene was thus coagulated. The coagulated polytetrafluoroethylene was separated, and dried at 210° C. for 18 hours to produce fine powder of the polytetrafluoroethylene. Various properties were measured for the fine powder produced. Table 1 shows the results.

TABLE 1

| | Polymer concentration (% by mass) | Standard specific gravity | Average primary particle size (nm) | Extrusion pressure (MPa) | Stress relaxation time (sec) | Break strength (N) | Stretch test (appearance) |
| --- | --- | --- | --- | --- | --- | --- | --- |
| Example 1 | 29.5 | 2.149 | 380 | 18.2 | 725 | 29.7 | Uniform |
| Example 2 | 30.9 | 2.152 | 339 | 19.1 | 675 | 35.2 | Uniform |

TABLE 1-continued

|  | Polymer concentration (% by mass) | Standard specific gravity | Average primary particle size (nm) | Extrusion pressure (MPa) | Stress relaxation time (sec) | Break strength (N) | Stretch test (appearance) |
|---|---|---|---|---|---|---|---|
| Example 3 | 30.3 | 2.154 | 325 | 17.3 | 525 | 29.9 | Uniform |
| Example 4 | 30.6 | 2.153 | 315 | 17.9 | 620 | 32.7 | Uniform |

INDUSTRIAL APPLICABILITY

The production method of the present invention can be particularly suitably used as a method of producing high-molecular-weight polytetrafluoroethylene.

The invention claimed is:

1. A composition comprising a fluorinated surfactant, a redox initiator and a polytetrafluoroethylene, having non-melt-secondary-processability, standard specific gravity of 2.160 or less, an average primary particle size of 150 nm or more, stress relaxation time of 500 seconds or more, and break strength of 32.0 to 49.0 N, the polytetrafluoroethylene being obtainable by emulsion polymerization of tetrafluoroethylene in the presence of the fluorinated surfactant, the stress relaxation time being determined using a stretched beading which is obtained by stretching a beading with an orifice having a diameter of 2.4 mm, and the break strength being determined by pulling, at a rate of 300 mm/min, the stretched beading,
    wherein the emulsion polymerization is initiated by the redox initiator,
    wherein the redox initiator is potassium permanganate/oxalic acid,
    wherein the polytetrafluoroethylene is obtainable by using the redox initiator in an amount of 17.5 to 32.9 ppm relative to final polytetrafluoroethylene yield,
    wherein the fluorinated surfactant is at least one selected from the group consisting of $CF_3OCF(CF_3)CF_2OCF(CF_3)COONH_4$ and $CF_3CF_2OCF_2CF_2OCF_2COONH_4$, and
    wherein the polytetrafluoroethylene is obtainable by using the fluorinated surfactant in an amount of 3299 to 6000 ppm relative to final polytetrafluoroethylene yield.

* * * * *